US012679439B2

(12) United States Patent (10) Patent No.: US 12,679,439 B2

McHugh (45) Date of Patent: Jul. 14, 2026

(54) SKI ATTACHMENT

(71) Applicant: Michael Benjamin McHugh,
Pointe-Claire (CA)

(72) Inventor: Michael Benjamin McHugh,
Pointe-Claire (CA)

( * ) Notice: Subject to any disclaimer, the term of this
patent is extended or adjusted under 35
U.S.C. 154(b) by 81 days.

(21) Appl. No.: 18/310,354

(22) Filed: May 1, 2023

(65) Prior Publication Data

US 2023/0373550 A1 Nov. 23, 2023

Related U.S. Application Data

(60) Provisional application No. 63/343,323, filed on May
18, 2022.

(51) Int. Cl.
*B62B 19/02* (2006.01)

(52) U.S. Cl.
CPC .................................... *B62B 19/02* (2013.01)

(58) Field of Classification Search
CPC ....................................................... B62B 19/02
See application file for complete search history.

(56) References Cited

U.S. PATENT DOCUMENTS

| | | | | | | |
|---|---|---|---|---|---|---|
| 1,438,326 | A | * | 12/1922 | Nelson | ..................... | B62B 19/02 |
| | | | | | | 280/13 |
| 2,589,602 | A | * | 3/1952 | Clark | ..................... | B62B 19/02 |
| | | | | | | 280/13 |

| | | | | | | |
|---|---|---|---|---|---|---|
| 3,070,383 | A | * | 12/1962 | Roe | ......................... | B62B 19/02 |
| | | | | | | 280/13 |
| 3,321,211 | A | * | 5/1967 | Bryant | ..................... | B62B 19/02 |
| | | | | | | 280/13 |
| 3,367,674 | A | * | 2/1968 | Puhl | ......................... | B62B 19/02 |
| | | | | | | 280/13 |
| 3,473,818 | A | * | 10/1969 | Meredith | ................ | B62B 19/02 |
| | | | | | | 280/13 |
| 4,194,753 | A | * | 3/1980 | Schrishuhn, Jr. | ....... | B62B 13/06 |
| | | | | | | 280/14.25 |
| 5,407,217 | A | * | 4/1995 | Lambert | ................. | B62B 19/02 |
| | | | | | | 280/47.38 |

(Continued)

OTHER PUBLICATIONS

Printout of web page https://ca.bataleon.com/pages/snowboards-3d-
shaping illustrating a snowboard, printed on May 1, 2023 by the
undersigned and submitted under file name NPL1.pdf. The Appli-
cant submits that the product illustrated in this pdf file was known
publicly at least as early as May 17, 2022.

(Continued)

*Primary Examiner* — Jeffrey J Restifo

(57) ABSTRACT

A ski attachment attachable to a wheel defining a nadir
section, the ski attachment comprising: an elongated ski
defining a longitudinal axis, the ski having a deck and a base,
the ski defining longitudinally opposed nose and tail ends; a
wheel mount for mounting the wheel to the ski at a location
intermediate the nose and tail ends, the wheel mount defin-
ing a nadir receiving portion for receiving the nadir section;
and a wheel lock for locking the wheel to the wheel mount;
wherein the base is configured so that a larger friction is
exerted on the ski attachment rearward of the nadir receiving (Continued)

portion than frontward of the nadir receiving portion when the ski attachment is pushed on a surface at an angle relative to the longitudinal axis.

13 Claims, 4 Drawing Sheets

(56)                References Cited

U.S. PATENT DOCUMENTS

| 5,413,361 | A | * | 5/1995 | Mosher | B62B 19/02 |
| | | | | | 280/8 |
| 5,427,390 | A | * | 6/1995 | Duncan | B62B 19/02 |
| | | | | | 280/47.38 |
| 7,163,209 | B2 | * | 1/2007 | Moscaret | B62B 19/02 |
| | | | | | 280/14.28 |
| 8,418,792 | B2 | * | 4/2013 | Rivard | B62K 5/01 |
| | | | | | 280/8 |
| 8,851,485 | B2 | * | 10/2014 | Bach | B62B 19/02 |
| | | | | | 280/8 |
| 9,139,216 | B1 | * | 9/2015 | Rivard | B62B 13/18 |
| 9,950,732 | B1 | * | 4/2018 | Patterson | B62B 19/02 |
| 10,023,220 | B1 | * | 7/2018 | Samuelian | B62B 19/02 |
| 11,097,763 | B1 | * | 8/2021 | Klassen | B62B 19/02 |
| 2010/0289231 | A1 | * | 11/2010 | Huot | B62B 19/02 |
| | | | | | 280/13 |
| 2015/0001816 | A1 | * | 1/2015 | Bach | B62B 19/02 |
| | | | | | 280/7.12 |
| 2023/0373550 | A1 | * | 11/2023 | McHugh | B62B 9/00 |
| 2024/0109578 | A1 | * | 4/2024 | Chaudeurge | B62B 19/02 |

OTHER PUBLICATIONS

Printout of web page https://polarskis.com/collections/ski-sets illustrating stroller skis, printed on May 1, 2023 by the undersigned and submitted under file name NPL2.pdf. The product illustrated in this pdf file was known publicly at least as early as May 17, 2022.
Printout of web page https://genuineguidegear.com/products/tension-straps illustrating a strap, printed on May 1, 2023 by the undersigned and submitted under file name NPL3.pdf. The product illustrated in this pdf file was known publicly at least as early as May 17, 2022.
Printout of web page https://www.tessier-adaptive-sports.com/en/wheelblades-snow-boards-wheelchair/ illustrating wheelchair skis, printed on May 1, 2023 by the undersigned and submitted under file name NPL4.pdf. The product Illustrated in this pdf file was known publicly at least as early as May 17, 2022.
Printout of image obtained from the internet at address https://www.pouponsetcie.ca/media/catalog/product/cache/7578021e899b3a01e25cc41602c75f3c/2/_/2_1_2048x.jpg illustrating stroller skis, printed on May 1, 2023 by the undersigned and submitted under file name NPL5.pdf. The product illustrated in this pdf file was known publicly at least as early as May 17, 2022.

* cited by examiner

SKI ATTACHMENT

FIELD OF THE INVENTION

The present invention relates to the general field of winter accessories, and, more particularly, to ski attachments attachable to a wheel.

BACKGROUND

Baby strollers sometimes need to be used in the winter season over soft surfaces, such as snow or slush. The relatively small wheels of these strollers make them difficult to use on such surfaces, as the wheels dig in the soft material, causing a large amount of friction. This friction increases the force required to push the stroller and may also cause lateral forces that reduce directional control accuracy.

Thus, there is a need for methods and devices for facilitating use of a baby stroller or other wheeled carriers in the snow.

SUMMARY OF THE INVENTION

In a broad aspect, there is provided a ski attachment attachable to a wheel defining a nadir section, the ski attachment comprising: an elongated ski defining a longitudinal axis, the ski having a deck and a base, the ski defining longitudinally opposed nose and tail ends; a wheel mount for mounting the wheel to the ski at a location intermediate the nose and tail ends, the wheel mount defining a nadir receiving portion for receiving the nadir section; and a wheel lock for locking the wheel to the wheel mount. The base is configured so that a larger friction is exerted on the ski attachment rearward of the nadir receiving portion than frontward of the nadir receiving portion when the ski attachment is pushed on a surface at an angle relative to the longitudinal axis.

There may also be provided a ski attachment wherein the base defines one or more longitudinally extending ridges protruding therefrom, a major portion of the one or more ridges being provided between the nadir receiving portion and the tail end.

There may also be provided a ski attachment wherein the nadir receiving portion is closer to the tail end than to the nose end.

There may also be provided a ski attachment wherein the wheel mount includes a tail wheel holder and a nose wheel holder each movable longitudinally along the deck.

There may also be provided a ski attachment wherein the tail and nose wheel holders are each selectively lockable at discrete longitudinally spaced apart locations along the deck.

There may also be provided a ski attachment wherein the tail and nose wheel holders are movable between the discrete longitudinally spaced apart locations and lockable thereto toollessly.

There may also be provided a ski attachment wherein the ski attachment defines a tail rail and a nose rail each extending longitudinally along the deck, the tail and nose wheel holders being mounted respectively to the tail and nose rails so as to be longitudinally movable therealong.

There may also be provided a ski attachment wherein the ski attachment defines a longitudinally extending toothed surface longitudinally serrated, and wherein at least one of the tail and nose wheel holders defines a wing defining wing teeth and resiliently deformable between an undeflected configuration and a deflected configuration, wherein the wing teeth are configured and sized to engage the toothed surface to longitudinally longitudinally lock the at least one of the tail and nose wheel holders relative to the deck.

There may also be provided a ski attachment wherein the at least one of the tail and nose wheel holders is movable along the deck when the wing is in the deflected configuration.

There may also be provided a ski attachment wherein the wings are biased towards the toothed surface when locked.

There may also be provided a ski attachment wherein the tail and nose wheel holders each include a cradle defining a wheel receiving recess for receiving part of the wheel.

There may also be provided a ski attachment wherein the wheel receiving recesses of the tail and nose wheel holders face each other and taper in directions leading away from each other.

There may also be provided a ski attachment wherein the wheel lock includes a strap for cooperatively encircling a rim of the wheel along with the deck to prevent the wheel from being removed from the deck.

There may also be provided a ski attachment wherein the strap defines opposed strap first and second ends, the strap defining a stopper at the strap first end, the strap also defining a plurality of longitudinally spaced apart strap apertures therealong, the ski attachment defining a strap mounting aperture for receiving the strap and configured and sized to prevent the stopper from passing therethrough, and a strap closing aperture laterally opposed to the strap mounting aperture for receiving the strap therethrough, the ski attachment also defining a tongue adjacent the strap closing aperture for engaging thereto one of the strap apertures to lock the strap in the strap closing aperture.

There may also be provided a ski attachment wherein the base is convex at the nose end.

There may also be provided a ski attachment wherein the base is wider at the nose end than at the tail end.

In another broad aspect, there is provided a ski attachment attachable to a swiveling wheel defining a nadir section, the ski attachment comprising: an elongated ski having a deck and a base, the ski defining longitudinally opposed nose and tail ends; a wheel mount for mounting the swiveling wheel to the deck at a location intermediate the nose and tail ends, the wheel mount defining a nadir receiving portion for receiving the nadir section; and a wheel lock for locking the wheel to the wheel mount. The nadir receiving portion is closer to the tail end than to the nose end. The ski attachment is self-orienting, such that, with the ski attachment operatively mounted to the swiveling wheel, the swiveling wheel is automatically oriented so that the nose end faces forwardly when the ski attachment is advanced.

There may also be provided a ski attachment wherein the nose end is further away from the nadir receiving portion than the tail end.

Advantageously, in some embodiments, the proposed ski attachment provides a self-centering effect aligning the ski attachment with a direction of motion when mounted to wheels that can pivot about a vertical axis. The proposed ski attachment may also be conveniently and quickly mounted to wheels having different diameters.

Other objects, advantages and features of the present invention will become more apparent upon reading of the following non-restrictive description of some embodiments thereof, given by way of example only with reference to the accompanying drawings.

DETAILED DESCRIPTION

The terms "substantially" and "about" are used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. Also, directional terminology, such as "top" and "bottom", is used with reference to a typical use of the proposed ski attachment in which the ski attachment is supporting a wheel on a substantially horizontal surface. This terminology is used for convenience and should not be used to unduly restrict the scope of the present invention.

Figure 1:
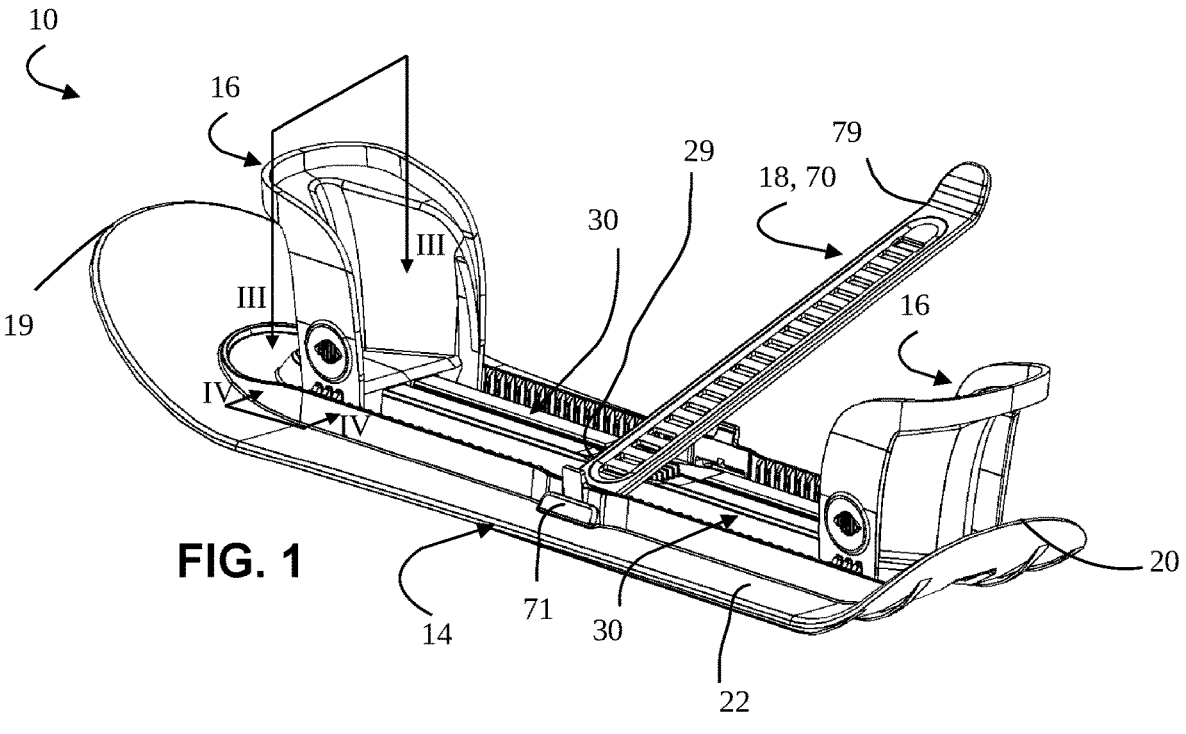
FIG. 1, in a perspective view, illustrates an embodiment of a ski attachment, here shown in an unlocked configuration.
Figure 2:
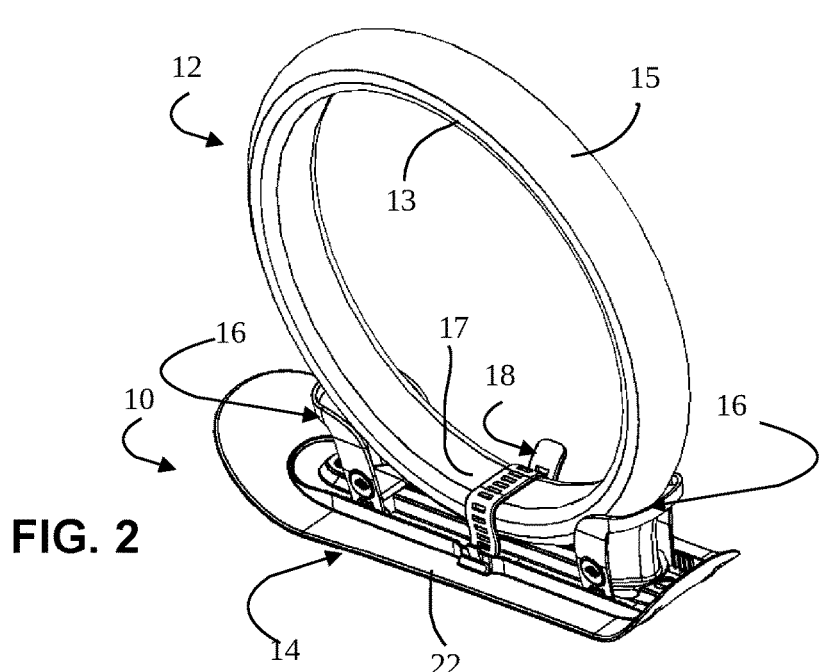
FIG. 2, in a perspective view, illustrates the ski attachment of FIG. 1 in a locked configuration and mounted to a wheel.

Referring to FIGS. 1 and 2, there is shown a ski attachment 10 attachable to a wheel 12 (shown only in FIG. 2). Only the rim 13 and tire 15 of the wheel 12 are represented in FIG. 2, and the spokes and hub that are conventional in wheels 12 are omitted. The wheel 12 defines a nadir section 17. The nadir section 17 is the portion of the wheel 12 that is closest to the ground when the wheel 12 is mounted to the ski attachment 10 with the latter positioned on the ground. The tire 15 may be airless or pneumatic, among other possibilities. The wheel 12 is for example the wheel 12 of a stroller. However, in some embodiments, the wheel 12 could be part of any other wheeled item pushable by an intended user, such as, non-limitingly, a carriage or a wheelchair.

The ski attachment 10 includes an elongated ski 14, a wheel mount for mounting the wheel 12 to the ski 14 and a wheel lock 18. For example, the wheel mount includes a pair of wheel holders 16 mounted to the ski 14 longitudinally spaced apart from each other and longitudinally movable relative thereto. The ski attachment 10 is movable between an unlocked configuration, seen in FIG. 1, and a locked configuration, seen in FIG. 2. In the locked configuration, the wheel holders 16 longitudinally flank the wheel 12 and each receive a portion of the wheel 12 thereinto. Also, the wheel lock 18 locks the wheel 12 to the ski attachment 10 so that the wheel 12 remains received in the wheel holders 16. In the unlocked configuration, the ski attachment 10 and the wheel 12 can be separated from each other.

Figures 8, 9:
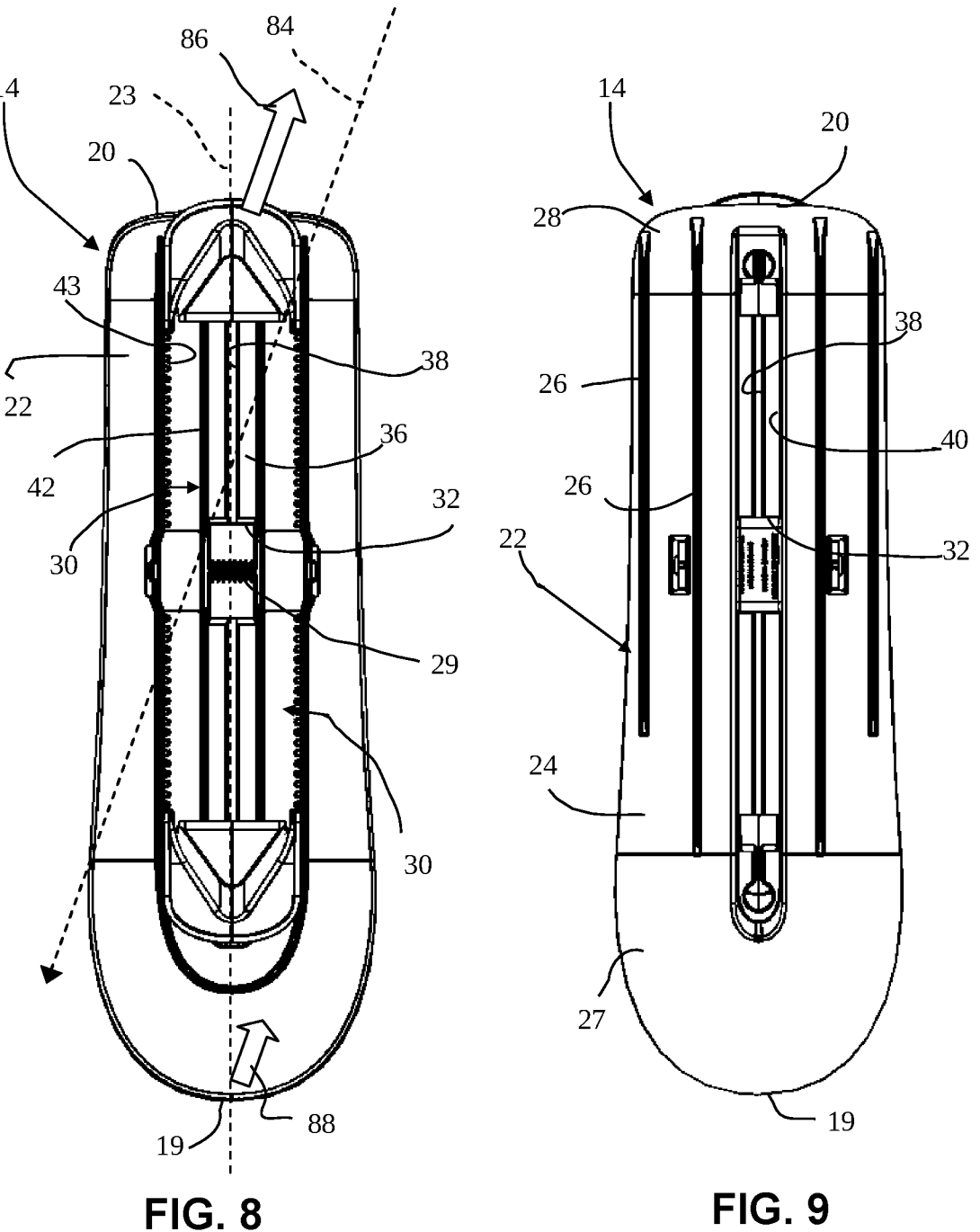
FIG. 8, in a top elevation view, illustrates the ski attachment of FIG. 1 with the wheel lock omitted.
FIG. 9, in a bottom elevation view, illustrates the ski attachment of FIG. 1 with the wheel lock omitted.
Figure 10:
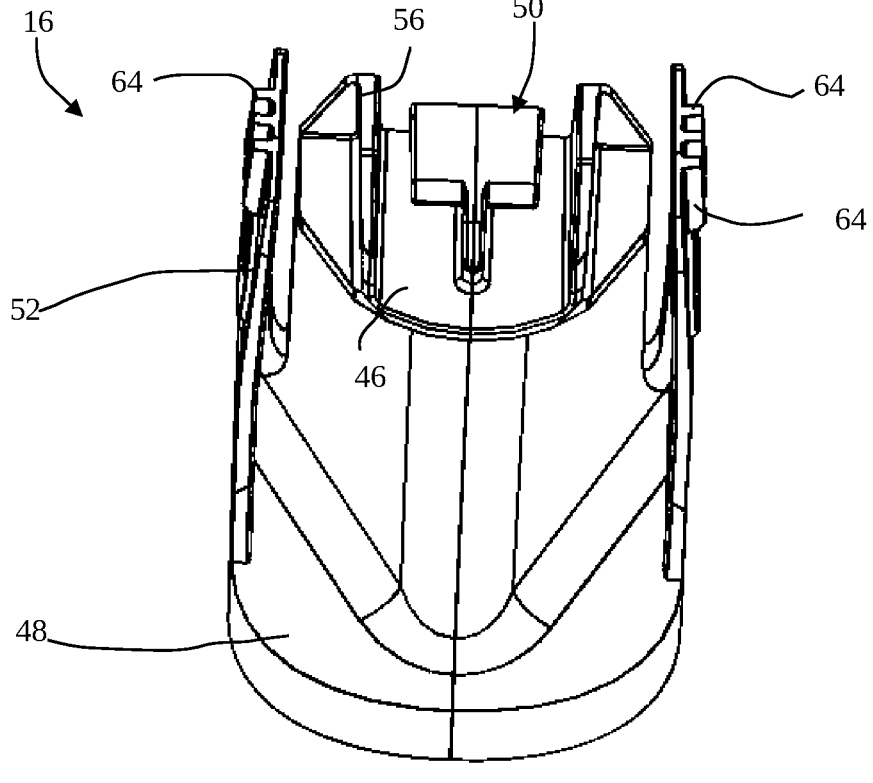
FIG. 10, in a bottom perceptive view, illustrates the wheel holder of FIG. 3.

Referring collectively to FIGS. 1, 8 and 9, the ski 14 defines a longitudinal axis 23 and defines longitudinally opposed nose and tail ends 19 and 20. The ski 14 also defines a deck 22, a base 24 and a nadir receiving portion 29 for receiving the nadir section 17, as further described below. The base 24 is configured so that a larger friction is exerted on the ski attachment 10 rearward of the nadir receiving portion 29 than frontward of the nadir receiving portion 29 when the ski attachment 10 is pushed on a surface at an angle relative to the longitudinal axis. For example, the base 24 typically defines a substantially flat portion from which one or more longitudinally extending ridges 26 protrude. A major portion of the one or more ridges 26 is provided between the nadir receiving portion 29 and the tail end 20. Typically, each ridge 26 has a portion thereof behind the nadir receiving portion 29 and a portion thereof in front of the nadir receiving portion 29, the latter portion being shorter than the former. Furthermore, in some embodiments not shown in the drawings, one or more ridges 26 may be provided solely in front of the nadir receiving portion 29 or behind the nadir receiving portion 29.

The ski attachment 10 also defines on its upper side a pair of longitudinally extending rails 30 longitudinally separated from each other by a gap 32 in the nadir receiving portion 29. In some embodiments, the gap 32 is provided centrally relative a flat portion of the base 24. The gap 32 is also usable to mount the wheel holders 16 to the ski 14 by allowing insertion thereinto of a portion of the wheel holder to be mounted to the rails 30. Each wheel holder 16 is mounted to a respective one of the rails 30 so as to be longitudinally movable therealong. For example, the rails 30 extend upwardly from the deck 22 and are laterally centered relative thereto. The rails 30 and wheel holders 16 are in some embodiments configured to allow selective movement of the wheel holders 16 along the rails and selective locking of each wheel holders 16 at longitudinally spaced apart locations along the deck 22 to allow selective variations in a distance between the two wheel holders 16 to fit the ski attachment 10 to wheels 12 of different diameters. In some embodiments, the wheel holders 16 are movable and lockable relative to the deck 22 toollessly.

In a specific embodiment, each rail 30 takes the form of an elongated hollow protrusion 36 opening downwardly and defining a slit 38 leading to a recess 40. The rails 30 therefore have in these embodiments an inverted U transversal cross-sectional configuration. The protrusions 36 are laterally flanked by a pair of grooves 42 opening upwardly and laterally terminated by a toothed surfaces 43 including a plurality of vertically extending elongated body teeth 44 facing the rail 30, as better seen in FIG. 4, creating a longitudinally serrated profile.

The ski 14 is angled upwardly relative to a central portion of the base 24 at the nose end 19 and tail end 20 to facilitate movements of the ski attachment 10 on relatively soft surfaces, such as snow. Also, the base 24 is convex at the nose end 19, and defines a convex base nose portion 27. In some embodiments, the base 24 also defines a convex base tail portion 28. This convex shape facilitates the movement of the ski attachment 10 when the latter is sunk in the soft surface as it pushes some of the soft surface laterally. This is to be contrasted to conventional stroller skis that typically have a flat nose. In some embodiments, the base nose portion 27 is wider than the base tail portion 28, which enhances the lift effect in fresh snow and slush so that the nose end 19 will naturally stay up and the tail end 20 will sink down, once again facilitating movements of the ski attachment 10. Typically, base nose portion 27 is both longer and wider than the base tail portion 28.

Referring collectively to FIGS. 3, 5, 7 and 10, the wheel holders 16 are substantially similar to each other and each includes a base 46, a cradle 48 extending upwardly from the base 46, a foot 50 protruding downwardly from the base 46 and a pair of laterally opposed wings 52. The wings 52 may extend from a top portion of the cradle 48, as shown in the drawings, or from the base 46 (not shown in the drawings). In some embodiments, a pair of guides 56 also extend downwardly from the base 46 on each side of the foot 50. In other embodiments, the guides 56 are omitted.

The cradle 48 defines a wheel receiving recess 62 open upwardly and on a face facing towards the gap 32. All the other 4 faces of the cradle 48 are closed. The cradle 48 thus defines a wheel receiving recess 62 for receiving part of the wheel 12. The wheel receiving recesses 62 of the two wheel holders 16 face each other so that when the cradles 48 are moved as much as possible towards each other with the wheel 12 therebetween, the wheel holders 16 prevent the wheel 12 from moving laterally or longitudinally away from the ski attachment 10. Typically, the wheel receiving recesses 62 are tapered in a direction leading away from each other to provide a relatively tight fit to wheels 12 having different dimensions.

The wheel holders 16 are configured to engage the rail 30 relatively snugly so that longitudinal movements along the rails 30 are the only movements that are allowed between the wheel holders 16 and the ski 14. More specifically, the foot 50 is substantially T-shaped and includes a stem 66 extending from the base 46 and through the slit 38 and a plate 68 parallel to the base 46 and spaced apart therefrom. The plate 68 is located in the recess 40. The rail 30 has a thickness at the slit 38 that is substantially similar to a length of the stem 66. The guides 56 are each located in a respective one of the grooves 42 and are spaced apart laterally from each other by a distance substantially similar to a width of the rail 30.

Figures 3, 4, 5, 6, 7:
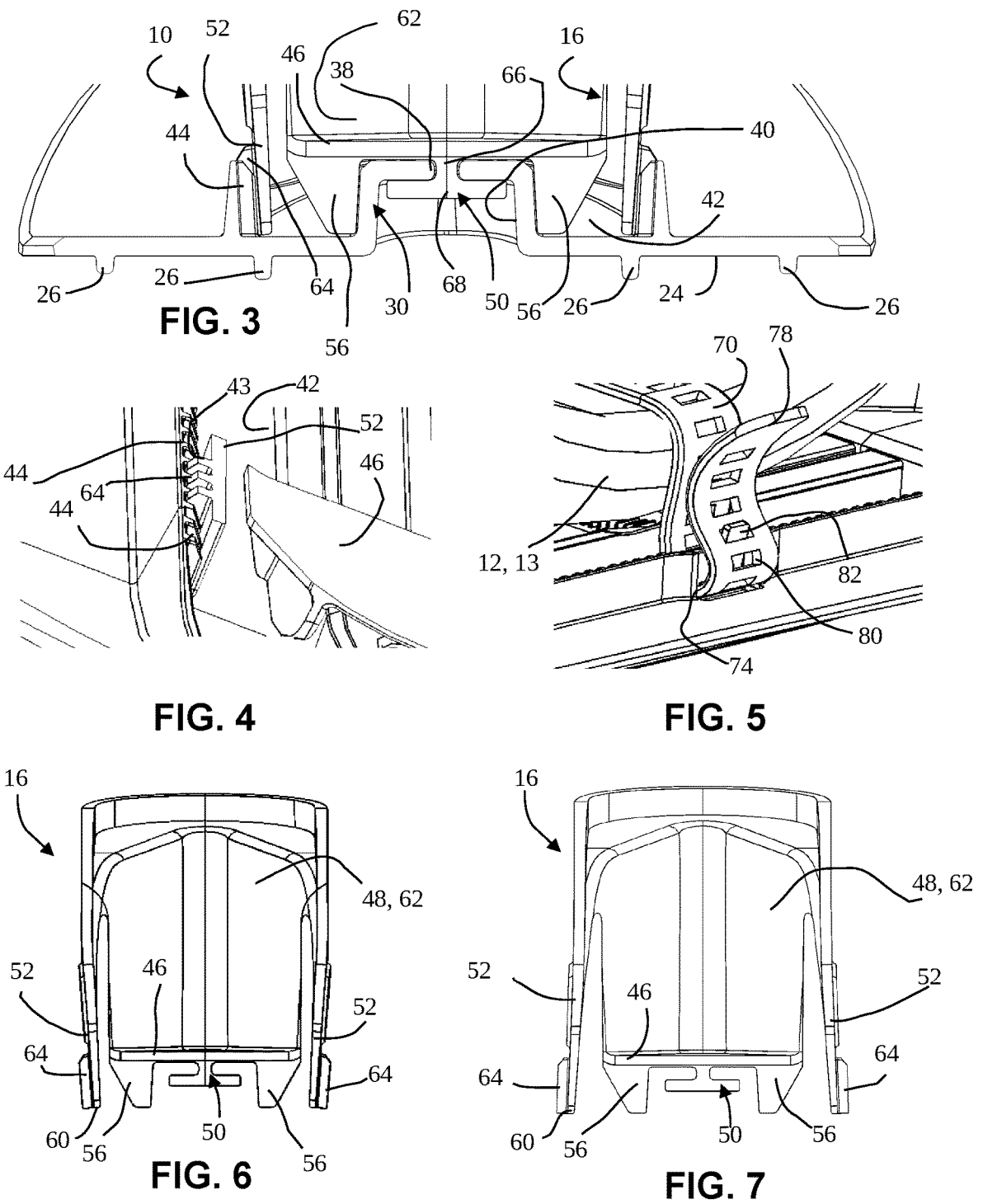
FIG. 3, in a front cross-sectional view along section line III-III of FIG. 1, illustrates a wheel holder part of the ski attachment of FIG. 1.
FIG. 4, in a partial front cross-sectional view along section line IV-IV of FIG. 1, illustrates the ski attachment of FIG. 1.
FIG. 5, in an enlarged perspective view, illustrates a detail of a wheel lock part of the ski attachment of FIG. 1.
FIG. 6, in a front elevation view, illustrates the wheel holder of FIG. 3, here shown with wings thereof in a deflected configuration.
FIG. 7, in a front elevation view, illustrates the wheel holder of FIG. 3, here shown with the wings thereof in an undeflected configuration.

The wings 52 are resiliently deformable between an undeflected configuration, seen in FIG. 7 and a deflected configuration, seen in FIG. 6, in which the wings are biased towards each other at their free end 60. The wings 52 are provided with wing teeth 64 configured to engage the body teeth 44 to longitudinally lock the wheel holders 16 relative to the deck 22. The width of the wings 52 in the undeflected configuration is larger than a distance between the toothed surfaces 43, so that the wings 52 are biased outwardly towards the toothed surface 43 when the wheel holders 16 are mounted to the ski 14, which locks longitudinally the wings 52, and therefore the wheel holders 16, due to the engagement between the body and wing teeth 44 and 64. The wheel holders 16 are movable along the deck 22 when the wings 52 are in the deflected configuration, as the wing teeth 64 are then disengaged from the body teeth 44.

Figure 11:
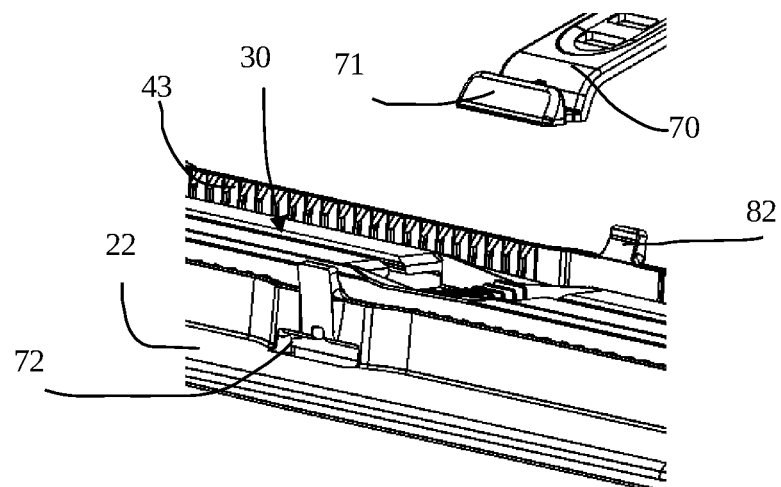
FIG. 11, in a partial exploded perspective view, illustrates some components of the ski attachment of FIG. 1.

Referring collectively to FIGS. 1, 5 and 11, the wheel lock 18 takes for example the form of a strap 70 mounted at one end to the ski 14, adjacent the gap 32. For example, the strap 70 is mounted through a strap mounting aperture 72 formed in the deck 22. The strap 70 includes a stopper 71 at one end thereof, which is larger than the strap mounting aperture 72 for preventing the strap 70 from passing completely through the strap mounting aperture 72. The strap 70 is configured to extend through the wheel 12 and maintain its rim 13, pushed against the deck 22 to prevent the wheel from being removed from the deck 22. To that effect, a strap closing aperture 74 is provided laterally opposed to the strap mounting aperture 72 and configured to receive a free end 78 of the strap 70 therethrough. To ensure that the strap 70 does not loosen unintentionally, the strap 70 may be provided with longitudinally spaced apart strap apertures 80 and the ski attachment 10 may define a tongue 82 adjacent the strap closing aperture 74 so that a suitable one of the strap apertures 80 may engage the tongue 82 to lock the strap 70 in a closed configuration. In some embodiments, the strap 70 includes a bend 79 adjacent the free end 78 to facilitate insertion of the strap 70 through the strap closing aperture 74.

In use, the ski attachment 10 is secured to a wheel 12 by positioning the nadir section 17 of the wheel 12 in the gap 32 and securing the ski attachment 10 to the wheel 12 using the strap 70. When the ski attachment 10 is used for the first time with a specific wheel 12, there may be a need to adjust the position of the wheel holders 16. To that effect, one presses the wings 52 towards each other to deform them and disengage the wing teeth 64 from the body teeth 44 and then moves the wheel holder 16 towards the gap 32 until the two wheel holders 16 are as close to possible to the wheel 12, followed by releasing the wings 52 to lock the longitudinal position of the wheel holders 16. Removal of the ski attachment 10 can then be performed by simply removing the strap 70 from the rim 13 and lifting the wheel away from the ski attachment 10.

Once the ski attachment 10 is attached to a wheel 12, the substantially flat portion of the base 24 spreads over a relatively large area the weight of a stroller or other wheeled device to which the ski attachment 10 is attached when the latter is pushed on soft surfaces, such as snow or slush, so that the stroller floats on the soft surface, and is therefore easier to push.

The ridges 26 facilitate tracking of the wheel 12 along the direction in which the stroller is moved. As illustrated in FIG. 8, if the ski attachment 10 is pushed on the ground in a direction 84 angled with the longitudinal axis 23, a rear friction force 86 exerted behind the gap 32 will be larger than a front friction force 88 exerted in front of the gap 32, due to the larger surface area presented by the ridges 26 in the corresponding location. This effect is enhanced in soft ground, for example in deeper snow, due to the tendency that the ski attachment 10 to point upward at the nose end 19, caused by the larger surface area of this portion of the ski attachment 10, which again causes a smaller lateral surface area of the ski attachment 10 to be in contact with the soft ground. This will create a torque on the ski attachment 10, so that the ski attachment 10 tends naturally to track along the direction 84 along which the ski attachment is pushed. Therefore, the wheels 12 to which the ski attachment 10 is secured will act similarly to the way the wheels 12 act on solid ground in the absence of the ski attachment 10. For strollers including caster, or swiveling, wheels, this will provide an intuitive manner of pushing the stroller when the ski attachment 10 is in use. The ridges 26 may have a substantially asymmetrical extent so that the ridges 26 are longer at the back of the gap 32, where the wheel 12 is received, than at the front of the gap 32. This configuration therefore create more friction at the back than at the front when the wheel 12 deviates from the direction of motion of the ski attachment 10, and therefore tends to counter-steer such deviations. This further enhances the natural feel of a wheeled stroller even when used with the ski attachment 10.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A ski attachment attachable to a wheel, the wheel defining a nadir section, the ski attachment comprising:

an elongated ski defining a longitudinal axis, the ski having a deck and a base, the ski defining longitudinally opposed nose and tail ends;

a wheel mount for mounting the wheel to the ski at a location intermediate the nose and tail ends, the wheel mount defining a nadir receiving portion for receiving the nadir section, wherein the nadir receiving portion is closer to the tail end than to the nose end; and a wheel lock for locking the wheel to the wheel mount;

wherein the base is configured so that a larger friction is exerted on the ski attachment rearward of the nadir receiving portion than frontward of the nadir receiving portion when the ski attachment is pushed on snow at an angle relative to the longitudinal axis;

wherein the wheel mount includes a tail wheel holder and a nose wheel holder each movable longitudinally along the deck;

wherein the ski attachment defines a tail rail and a nose rail each extending longitudinally along the deck, the tail and nose wheel holders being mounted respectively to the tail and nose rails so as to be longitudinally movable therealong; and wherein the ski attachment defines a longitudinally extending toothed surface longitudinally serrated, and wherein at least one of the tail and nose wheel holders defines a wing defining wing teeth, the wing being resiliently deformable between an undeflected configuration and a deflected configuration, wherein the wing teeth are configured and sized to engage the toothed surface to longitudinally lock the at least one of the tail and nose wheel holders relative to the deck.

2. The ski attachment as defined in claim 1, wherein the base defines one or more substantially longitudinally extending ridges protruding therefrom, a major portion of the one or more ridges being provided between the nadir receiving portion and the tail end.

3. The ski attachment as defined in claim 1, wherein the tail and nose wheel holders are each selectively lockable at discrete longitudinally spaced apart locations along the deck.

4. The ski attachment as defined in claim 3, wherein the tail and nose wheel holders are movable between the discrete longitudinally spaced apart locations and lockable thereto toollessly.

5. The ski attachment as defined in claim 1, wherein the at least one of the tail and nose wheel holders is movable along the deck when the wing is in the deflected configuration.

6. The ski attachment as defined in claim 1, wherein the wings are biased towards the toothed surface when locked.

7. The ski attachment as defined in claim 1, wherein the tail and nose wheel holders each include a cradle defining a wheel receiving recess for receiving part of the wheel.

8. The ski attachment as defined in claim 7, wherein the wheel receiving recesses of the tail and nose wheel holders face each other and taper in directions leading away from each other.

9. The ski attachment as defined in claim 1, wherein the wheel lock includes a strap for cooperatively encircling a rim of the wheel along with the deck to prevent the wheel from being removed from the deck.

10. The ski attachment as defined in claim 9, wherein the strap defines opposed strap first and second ends, the strap defining a stopper at the strap first end, the strap also defining a plurality of longitudinally spaced apart strap apertures therealong, the ski attachment defining a strap mounting aperture for receiving the strap and configured and sized to prevent the stopper from passing therethrough, and a strap closing aperture laterally opposed to the strap mounting aperture for receiving the strap therethrough, the ski attachment also defining a tongue adjacent the strap closing aperture for engaging thereto one of the strap apertures to lock the strap in the strap closing aperture.

11. The ski attachment as defined in claim 1, wherein the base is convex at the nose end.

12. The ski attachment as defined in claim 11, wherein the base is wider at the nose end than at the tail end.

13. A ski attachment attachable to a wheel, the wheel defining a nadir section, the ski attachment comprising:

an elongated ski defining a longitudinal axis, the ski having a deck and a base, the ski defining longitudinally opposed nose and tail ends;

a wheel mount for mounting the wheel to the ski at a location intermediate the nose and tail ends, the wheel mount defining a nadir receiving portion for receiving the nadir section, wherein the nadir receiving portion is closer to the tail end than to the nose end; and a wheel lock for locking the wheel to the wheel mount, the wheel lock including a strap for cooperatively encircling a rim of the wheel along with the deck to prevent the wheel from being removed from the deck;

wherein the base is configured so that a larger friction is exerted on the ski attachment rearward of the nadir receiving portion than frontward of the nadir receiving portion when the ski attachment is pushed on snow at an angle relative to the longitudinal axis;

further wherein the strap defines opposed strap first and second ends, the strap defining a stopper at the strap first end, the strap also defining a plurality of longitudinally spaced apart strap apertures therealong, the ski attachment defining a strap mounting aperture for receiving the strap and configured and sized to prevent the stopper from passing therethrough, and a strap closing aperture laterally opposed to the strap mounting aperture for receiving the strap therethrough, the ski attachment also defining a tongue adjacent the strap closing aperture for engaging thereto one of the strap apertures to lock the strap in the strap closing aperture.

* * * * *